March 9, 1937.  S. M. NAMPA  2,073,349
CAR LOADING DEVICE
Filed Feb. 15, 1934
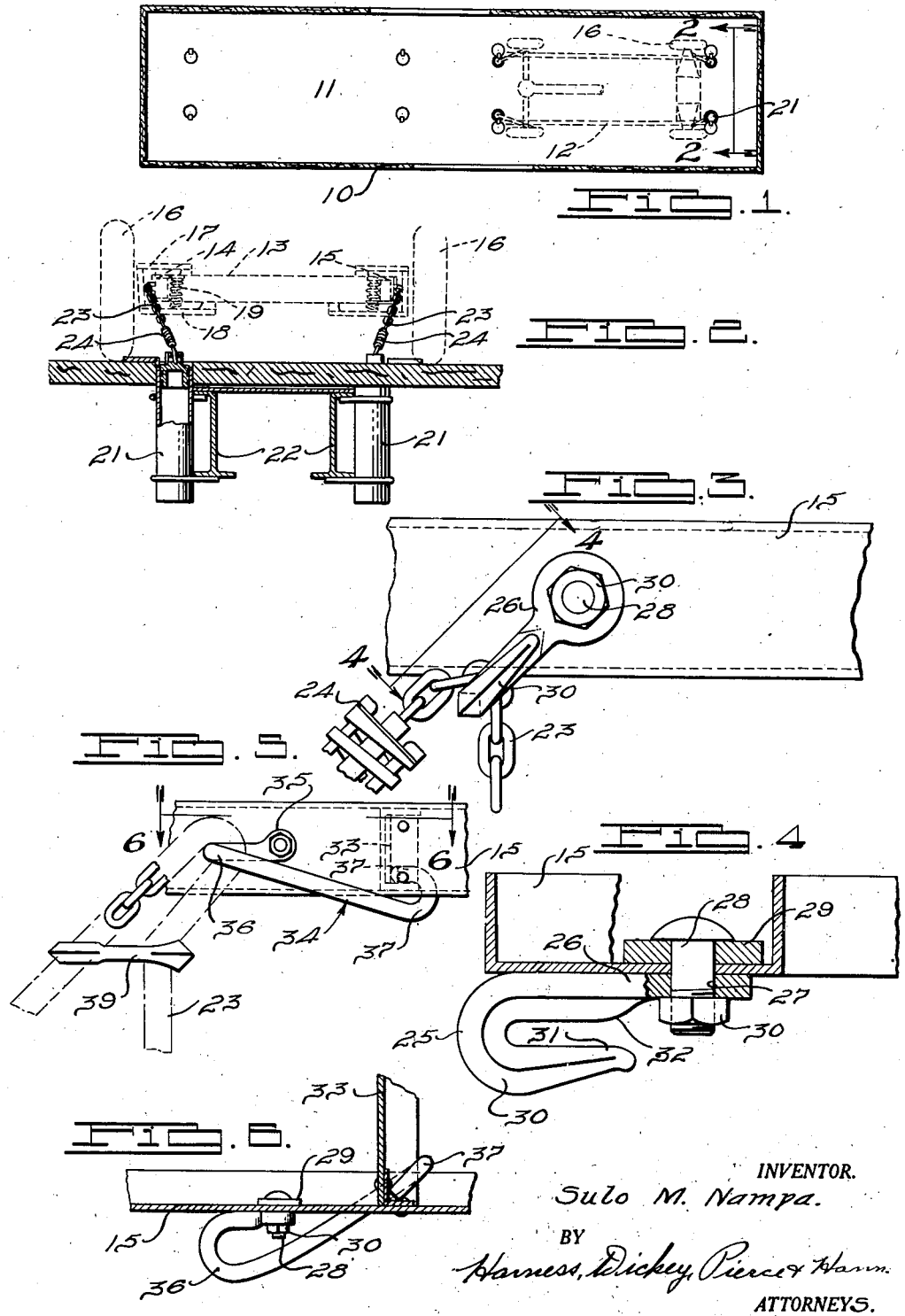
INVENTOR.
Sulo M. Nampa.
BY
Harness, Dickey, Pierce & Harm.
ATTORNEYS.

Patented Mar. 9, 1937

2,073,349

UNITED STATES PATENT OFFICE 2,073,349

CAR LOADING DEVICE

Sulo M. Nampa, Detroit, Mich., assignor to The Worth Company, a corporation of Michigan Application February 15, 1934, Serial No. 711,307

11 Claims. (Cl. 248—119)

The invention relates to loading devices and has particular relation to a device for loading automobiles in freight cars.

One object of the invention is to provide a loading device for loading automobiles in freight cars which is connected to the chassis frame of the automobile so as to obtain an improved anchorage of the automobile body.

Another object of the invention is to provide a loading device particularly adapted to be used in conjunction with automobiles having individually sprung wheels where the axle is usually eliminated.

Another object of the invention is to provide a loading device such as mentioned wherein the springs between the chassis frame of the automobile and wheels are utilized operatively in the anchoring means.

Other objects of the invention will become apparent from the following description, the drawing relating thereto and from the claims hereinafter set forth.

For a better understanding of the invention reference may be had to the drawing forming a part of the specification, wherein:

Figure 1 is a plan view of the interior of a freight car and the manner in which an automobile is anchored therein according to one form of the invention.

Fig. 2 is a cross-sectional view on a larger scale taken substantially along the line 2—2 of Fig. 1.

Fig. 3 is a fragmentary view on a larger scale illustrating more particularly the manner in which the anchoring means is connected to the chassis frame of the automobile.

Fig. 4 is a cross-sectional view on a larger scale taken substantially along the line 4—4 of Fig. 3.

Fig. 5 illustrates an anchoring device on the chassis frame which is constructed according to another form of the invention.

Fig. 6 is a plan view of the construction shown by Fig. 5, taken substantially along the line 6—6 of Fig. 5.

Referring to the drawing, the side of the freight car is indicated at 10, the floor at 11 and an automobile in the car is indicated in broken lines at 12. Normally two automobiles are anchored to the floor and then at each end of the car an automobile is anchored in an inclined position over the end of the adjacent car anchored on the floor and this invention is applicable to either the automobile supported on the floor or the automobile supported in a raised and inclined position. Particularly the invention is concerned with an automobile having individually sprung wheels and as shown by Fig. 2 this type of automobile may include a chassis frame 13 having side channel members 14 and 15 that normally have their open sides innermost. The wheels indicated at 16 may be individually sprung in any of the well known ways and as shown upper and lower links 17 and 18 are pivotally connected to the wheel and to the frame to allow vertical pivotal movement of the wheel with respect to the frame. Between the link 18 and a part of the frame, a spring 19 may be interposed so as to cushion the frame on the wheel.

For anchoring the automobile to the floor of the freight car, housing wells 21 may be secured to the beam structure 22 underneath the car and each of these housing wells is adapted to receive a chain anchoring device 23 that may include a resilient connection 24. This type of anchoring means is disclosed and claimed in the copendng application of Samuel D. Butterworth, Serial No. 606,602, filed April 21, 1932. It should be understood that when the chain devices 23 are not in use that they will slip down into the housing well 21 so as to be concealed under the floor.

As best shown by Figs. 3 and 4, a hook member 25 is secured to each of the side members 14 and 15 of the chassis frame and this hook member includes a substantial base portion 26 that is apertured as indicated at 27 for receiving a bolt 28 which is connected to the base portion of the channel frame member. A washer 29 or the like may be interposed between the head of the bolt and the base portion of the channel and a nut 30 may be provided on the outer end of the bolt for tightly drawing the base portion of the hook against the outer side of the channel. Normally in practice the automobile manufacturer leaves one or more openings in the base portion of the channel which may be used for securing the hook member thereto, although openings may be formed if it is found necessary. The hook member includes a hook portion 30 which has a narrow throat 31, and, as shown, the links of the chain may be secured to the hook portion for anchoring the chain device 23 to the chassis frame of the automobile. On either side of the hook the walls along the throat are concave as indicated at 32. One link of the chain may be slipped edgewise into the throat as shown and the concave portions 32 are adapted to accommodate the ends of the adjacent links. It will be noted that the pivotal mounting of the hook allows such positioning of the hook that the bolt 28 may be aligned with the line of pull on the chain. It should be appreciated that the connection between the chain devices and the frame operatively includes the springs 19 for connecting the automobile to the frame as downward movement of the latter is resiliently opposed by the springs as well as the tires on the wheel, while upward or rebound movement of the frame is practically eliminated although the springs 24 of the chain devices will allow a slight cushioned rebound. This type of anchoring device has been found to be very efficient for properly anchoring and loading automobiles in freight cars and preventing bouncing or rebounding movements of the automobiles and consequent engagement thereof with other automobiles or the car roof. In the case of the automobile which is inclined and usually spaced from the floor, constructions now being used include a frame which is elevated and the wheels of the automobile rest in channelways on this frame. Chain devices anchored to this supporting frame may correspond generally to the chain devices shown, except of course, the lower ends of the chain devices will be secured directly to the frame instead of to the housing wells shown. In other respects the manner of connecting the chassis frame of the automobile to the elevated supporting frame may be the same as that for anchoring the automobile on the floor of the freight car.

In the construction shown by Figs. 5 and 6 the frame is shown as having a cross channel frame member 33 connecting the side channels 15 adjacent the end of the frame. For anchoring the frame a member 34 is provided which has a flattened, apertured end 35 secured to the side member 15 by means of a bolt assembly such as shown by Fig. 4. This member has a forward attaching portion or loop 36 and then extends rearwardly, downwardly and inwardly and finally terminates in a hook 37 that engages in the corner formed by joining the channel members 15 and 33. It follows that the member 34 is positively yet simply connected to the chassis frame. In anchoring the automobile, the chain 23 is slipped through the member 34 and then the chain portions are connected by means of a grab hook 39. This hook forms the subject matter of Patent 1,889,633 issued to Samuel D. Butterworth.

If desired, the member 34 may have a narrow throat, such as the throat 31, in place of the larger portion 36 or in other words the looped portions of the latter may be brought closer together so as only to receive a link slipped into the throat from its entry. In this case the chain could be attached to the member before securing the latter to the frame or the member could be spaced a greater amount from the frame at another point to permit inserting the chain after the member is secured to the frame. With this construction the grab hook 39 could be eliminated.

It may be mentioned that the device shown by Fig. 4 is particularly useful where the permissible length of chain between the spring device 24 and the point of connection with the chassis frame practically precludes use of the grab hook 39.

Although more than one form of the invention has been illustrated and described, it will be apparent to those skilled in the art that various modifications may be made without departing from the scope of the appended claims.

I claim:

1. The combination with an automobile chassis frame having a projecting portion, of an anchoring member having one end secured to the frame and a hook portion at its other end hooked about the projecting portion on the frame.

2. In a car loading device, a member having an aperture at one end for attaching it to a chassis frame member and having a hook portion at its other end adapted to hook over a projection on the frame.

3. In a car loading device, a member having an aperture at one end for attaching it to a chassis frame member and having a hook portion at its other end adapted to hook over a projection on the frame, said member being so directed intermediate its ends that the ends may be located at opposed sides of the frame member with the intermediate portion extending transversely over the frame member.

4. In a car loading device, a member having an aperture at one end for attaching it to a chassis frame member and having a hook portion at its other end adapted to hook over a projection on the frame, said member being curved intermediate its ends to provide an attachment loop.

5. In an automobile loading device, a vehicle for conveying automobiles having a chassis frame provided with a projecting portion, an anchoring member having one end secured to the frame and a hook portion at its other end hooked about the projecting portion on the frame, and flexible means fastened to said vehicle and said anchoring member in a manner as to support said automobile relative to said vehicle.

6. In an automobile loading device, a vehicle for conveying automobiles having a chassis frame member, an anchoring member having an aperture at one end to receive a means securing same relative to said frame member and having a hook portion at its other end adapted to hook over a projection on the frame, and flexible means operatively associated with said anchoring member and said vehicle in manner as to support said automobile relative to said vehicle.

7. In an automobile loading device, a vehicle for conveying automobiles having a chassis frame member, an anchoring member having an aperture adjacent one end for receiving means securing same relative to said chassis and having a hook at its other end to extend over a projection on the frame member, said member being so directed intermediate its ends that the ends may be located at opposed sides of the frame member with the intermediate portion extending transversely over the frame member, and means operatively associated with said anchoring member and said vehicle in manner as to support said automobile relative to said vehicle.

8. In combination with an automobile having a frame member, a car loading device comprising a hook member having a flat portion pivotally secured to the frame member against the face thereof and the remaining portion of said hook extending along the face of said frame member and being reversely bent upon itself in a plane vertical to the face of said frame member in a manner so as to provide a throat opening of uniform width throughout for engaging a car loading chain means in a fixed relation.

9. In combination with a conveyor for an automobile having a frame member, an automobile in said conveyor, a car loading member having a flat portion pivotally secured to the frame member against a face surface thereof and the remaining portion of said car loading member having a throat therein of a uniform width throughout disposed in a plane vertical to said face surface, and chain means secured at one end to said conveyor and adjacent the other end thereof engaging said car loading device in a fixed relation in said throat thereof so as to support said automobile relative to said conveyor.

10. In combination with a platform, an automobile on the platform resting on its wheels and having a chassis frame, resilient means supporting the chassis frame on the wheels, and means for anchoring the automobile on the platform including devices connected to the chassis frame and platform so as to place the resilient means in a position wherein it opposes the action of the anchoring means, said devices including resilient elements whereby the automobile is held in position both by its own resilient supporting means and by the resilient elements in said devices.

11. In combination with a platform, an automobile on the platform resting on its wheels and having a chassis frame, springs supporting the chassis frame on the wheels, devices for anchoring the automobile on the platform and connected to the chassis frame and platform so as to place the springs in a position wherein they oppose the action of said devices, and additional springs forming a part of said devices and providing a spring connection directly between the chassis frame and the platform from which it follows that downward movement of the chassis frame is resisted directly by the automobile springs and upward movement of the chassis frame is resisted directly by the springs in said devices.

SULO M. NAMPA.